United States Patent [19]

Lamparsky et al.

[11] 3,926,8

[45] Dec. 16, 19

[54] SUBSTITUTED 2-[3'-METHYL-2'-BUTEN]YL-4-HEXENAL ODORANT COMPOSITIONS

[75] Inventors: Dietmar Lamparsky, Wangen-Dubendorf; Jean-Pierre Calame, Fallanden, both of Switzerland

[73] Assignee: Givaudan Corporation, Clifton, N.J.

[22] Filed: July 30, 1974

[21] Appl. No.: 493,002

Related U.S. Application Data

[62] Division of Ser. No. 323,190, Jan. 12, 1973, abandoned.

[30] Foreign Application Priority Data

Jan. 21, 1972 Switzerland.......................... 907/72

[52] U.S. Cl. ............................................... 252/522
[51] Int. Cl.²....................... C11B 9/00; A61K 7/00
[58] Field of Search ..................................... 252/522

[56] References Cited
UNITED STATES PATENTS
3,391,192  7/1968  Zuech et al........................ 260/601

OTHER PUBLICATIONS

Chem. Abstracts, Vol. 50 : 5568, 1956.

Steffen Arctauder, Perfume and Flavor Material Natural Origin, Elizabeth, N.J. (U.S.A.) 1960, 296–299.

*Primary Examiner*—Veronica O'Keefe
*Attorney, Agent, or Firm*—Thomas Cifelli, Jr.

[57] ABSTRACT

The novel aldehydes have the following general mula

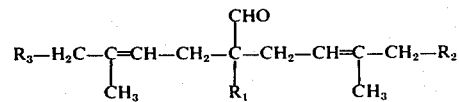

wherein $R_1$, $R_2$ and $R_3$ each represent a hydro atom or a methyl group.

8 Claims, No Drawings

SUBSTITUTED 2-[3'-METHYL-2'-BUTEN]YL-4-HEXENAL ODORANT COMPOSITIONS

This is a division of application Ser. No. 323,190, filed Jan. 12, 1973, now abandoned.

FIELD OF THE INVENTION

Aliphatic, diolefinic aldehydes having interesting olfactory properties.

RELATED APPLICATION

This application claims priority from the copending Swiss application, No. 907/72, filed Jan. 21, 1972.

SUMMARY OF THE INVENTION

A preferred class of aldehydes of formula I comprises those of the general formula

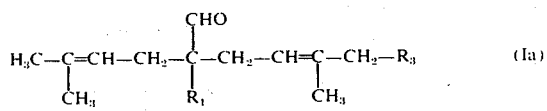

wherein $R_1$ and $R_2$ have the significance given earlier.

Acoording to the process provided by the present invention, the aldehydes of formula I hereinbefore are manufactured by reacting an acetal of the general formula

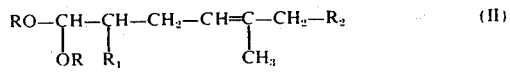

wherein $R_1$ and $R_2$ have the significance given earlier and R represents an alkyl group containing from 1 to 6 carbon atoms,
or an enol ether of the general formula

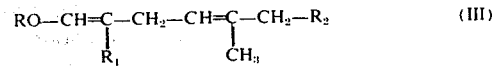

wherein R, $R_1$ and $R_2$ have the significance given earlier,
with an alkenol of the general formula

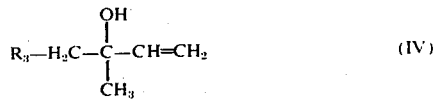

wherein $R_3$ has the significance given earlier,
in the presence of an acidic catalyst.

DETAILED DESCRIPTION OF THE INVENTION

The $C_1$–$C_6$-alkyl group denoted by R in formulae II and III can be a straight-chain or branched-chain alkyl group such as methyl, ethyl, propyl, isopropyl or hexyl. R preferably represents the ethyl group.

The aldehydes of formula Ia, which are particularly preferred from the fragrance point of view, can be manufactured either a. by reacting an alkenol of formula IV in which $R_3$ represents a hydrogen atom (i.e. 2-methyl-3-buten-2-ol) with an acetal of formula II or an enol ether of formula III in which $R_2$ represents a hydrogen atom the methyl group, or b. by reacting an alkenol of formula IV in which represents a methyl group (i.e. 3-methyl-1-pente ol) with an acetal of formula II or an enol ethe formula III in which $R_2$ represents a hydrogen ato The reaction of an alkenol of formula IV with acetal of formula II or an enol ether of formula III be carried out in a manner known per se (see, for ample, Swiss Pat. specification No. 416596). Thus the acidic catalyst there can be used, for exampl mineral acid such as sulphuric acid or, especially, p| phoric acid. However, there can also be used a str organic acid such as oxalic acid, trichloroacetic a p-toluenesulphonic acid, an acidic salt such as, example, potassium bisulphite or a Lewis acid suc boron trichloride, boron trifluoride or zinc chlorid According to a particularly preferred embodimer pyridine hydrohalide, especially pyridine hydroc ride, is used as the acidic catalyst since in this cas< aldehyde of formula I is obtained in particularly g yields. The concentration of this catalyst in the reac mixture expediently amounts to about 2–5 wt.%, e cially to about 3–4 wt.%, corresponding to a cat amount of ca 1/10 molar equivalent, based on amount of acetal or enol ether starting material u The reaction using this catalyst is preferably car out in the presence of a solvent. Especially suit solvents are aromatic hydrocarbons such as, for ex ple, benzene, toluene or xylene. However, high-bo petroleum ethers or chlorinated aliphatic hydrocarl such as, for example, methylene chloride, ethy chloride or trichloroethylene, can also be used. A ticularly preferred solvent is toluene.

In this preferred embodiment the reaction is pref bly carried out under atmospheric pressure. The ac of formula II or the enol ether of formula III or a ture of such an acetal and enol ether is, for exarr heated in the presence of the alkenol of formula IV the catalyst in one of the solvents mentioned earli< the reflux temperature of the reaction mixture anc alcohol ROH formed during the reaction is cont ously distilled off from the reaction mixture (e.g. a azeotrope with the solvent used). Preferably, the volume of the reaction mixture as well as the orij ratio of the reactants is approximately maintaine< the addition of solvent and/or alkenol (which can ( off in small amounts at the same time as the alk ROH liberated during the reaction distils off). optimal (mol) ratio of acetal of formula II or enol € of formula III to alkenol of formula IV amoun1 about 1:1.5. The solvent should, for example, be 1 ent in amounts (by weight) which correspond to a double the amount of acetal (or enol ether) an< kenol.

In order to achieve optimal yields, the progress o reaction is expediently followed by the removal of ples which are analysed (e.g. by gas-chromatograf the heating being discontinued as soon as the acet enol ether reactant has reacted to around 95 per in this case the yield of aldehyde of formula I amount to 70 percent or above. In general, the rea duration necessary for this is about 20 hours.

The resulting aldehyde of formula I can be iso from the mixture of the reaction products in a ma known per se, expediently by fractional distilla Advantageously, the catalyst is neutralised befor distillation by the addition of an inorganic or or{ agent such as sodium acetate, caustic soda, so-
carbonate, ammonia, a tertiary amine such as
ιylamine or pyridine, etc and thereafter removed
the reaction mixture if desired.

ofar as they are not known, the acetals of formula
d the enol ethers of formula III can be prepared
rding to methods known per se (see, for example,
an Pat. specification No. 650657).

e aldehydes of formula I provided by the present
ιtion, particularly those of formula Ia, possess
esting odorant properties. As will be evident from
ollowing descriptions, their character can gener-
)e denoted as hesperidin-like and green. The quite
ordinary fresh character is also of significance.
fragance character is peculiar to the aldehydes of
ula I and, in particular, to those of formula Ia as
with lower and higher homologues have shown.

-Dimethyl-2-[3'-methyl-2'-buten]yl-4-hexenal:
eridin-like (lemon), green, spicy, fruity and floral.
aldehyde is well suited as a modifier of the top-
s of floral and/or green compositions. It increases
diffusibility of, for example, woody and chypre
positions.

Methyl-2-[3'-methyl-2'-buten]yl-4-hexenal: hes-
lin-like, very fresh, natural-green, floral (of roses),
lise and lavender. This aldehyde is especially suit-
for floral compositions such as muguet, lilac and
enia to which it conveys "lightness" and a pro-
ced diffusibility. However, the character of fou-
and animal compositions are also improved by
is of this aldehyde.

Methyl-2-[3'-methyl-2'-buten]yl-4-heptenal: simi-
) the last-mentioned aldehyde, but with a fruitier
greener character.

-Dimethyl-2-[3'-methyl-2'-buten]yl-4-heptenal:
eridin-like, green, somewhat woody.

the basis of their interesting olfactory properties,
h stand out from a whole series of structurally
ed aldehydes, the aldehydes of formula I can ac-
ingly be used as odorants; for example in perfum-
or the manufacture of odorant compositions such
rfumes or for perfuming products of all kinds such
or example, soaps, washing agents, detergents,
sols or other cosmetic products such as salves,
milk, make-up, bath salts, etc.

e concentration in which the aldehydes of formula
used can vary within wide limits depending on the
ose of use, for example between about 0.1 and
t 20 wt.%. For odorant compositions the preferred
entrations lie in the range of from about 1 to about
%.

e following Examples illustrate the process pro-
l by the present invention:

EXAMPLE 1

) g of 2-methyl-3-buten-2-ol, 2 g of crystalline
phoric acid and 500 g of 2,5-dimethyl-4-hexenal
ylacetal are placed successively, with stirring, in a
ble reaction vessel and the mixture is then held at
x for 5 hours while gassing with nitrogen. In so
z, the temperature falls from 107°C to 102°C. The
x condenser is then replaced by a column having a
lation bridge and the ethanol formed is distilled off
y in the course of 6 to 8 hours. In so doing, the
erature rises continuously to 140°C. At this tem-
ture, with the same rate of heating, the distillation
is to proceed more rapidly, the head temperature
g off (formation of isoprene from methylbutenol).

A total of 425 ml of distillate are collected. After com-
pletion of the reaction, the reaction product is cooled,
diethyl ether is added and the ethereal solution is
washed with sodium hydrogen carbonate solution and
water and then dried. After distilling off the solvent, the
crude product is fractionally distilled in a vacuum.
There are obtained 240 g (49% of theory) of 2,5-
dimethyl-2-[3'-methyl-2'-buten]yl-4-hexenal of boiling
point 115°–117°C/20 mmHg; $n_D^{20} = 1.4688$.

EXAMPLE 2

8.6 g of 2-methyl-3-buten-2-ol, 0.1 g of 85% phos-
phoric acid and 30.8 g of 1-ethoxy-2,5-dimethyl-1,4-
hexadiene are mixed in a suitable autoclave. After
pressurisation with nitrogen (5 kg/cm$^2$), the autoclave
is placed in an oil-bath (preheated to 165°C) and
heated for 1.5 hours to an internal temperature of
165°C ±5°C. In so doing, the pressure reaches maxi-
mally 10.4 kg/cm$^2$. After chilling the autoclave and
discharging the excess pressure, the reaction mixture is
treated with ca 1 ml of triethylamine and fractionally
distilled in a vacuum. There are obtained 10.6 g of
2,5-dimethyl-2-[3'-methyl-2'-buten]yl-4-hexenal (54
percent of theory) of boiling point 112°–113°C/13
mmHg; $n_D^{20} = 1.4680$. The purity according to gas-
chromatography is ca 85%.

EXAMPLE 3

400 g of 2,5-dimethyl-4-hexenal diethylacetal, 258 g
of 2-methyl-3-buten-2-ol, 1000 g of toluene and 24 g of
pyridine hydrochloride are placed in a reaction vessel
provided with a thermometer, dropping funnel and a 40
cm Vigreux column having a distillation bridge. The
mixture is heated to boiling and the toluene/ethanol
azeotrope, which contains some 2-methyl-3-buten-2-ol,
is distilled off slowly over the Vigreux column. Fresh
toluene (a total of 3 kg) is allowed to flow in through
the dropping funnel at the same rate as the solvent
distils off. In addition, after 7 hours, a further 43 g of
2-methyl-3-buten-2-ol are added and the distillation is
continued up to a total duration of 20 hours. After this
time, ca 90 percent of the starting materials have re-
acted. The addition of fresh toluene is stopped and the
solvent remaining in the reaction flask is removed as far
as possible by distillation. The reaction mixture is
treated with 16 g of sodium acetate and fractionally
distilled in a vacuum. There are obtained 290 g (74% of
theory) of 2,5-dimethyl-2-[3'-methyl-2'-buten]yl-4-
hexenal of boiling point 112°C/12 mmHg.

EXAMPLE 4

In an analogous manner to that described in Example
1, a mixture of 171 g of 2-methyl-3-buten-2-ol, 2 g of
crystalline phosphoric acid and 398 g of 5-methyl-4-
hexenal diethylacetal is held at reflux for 5 hours with
stirring and gassing with nitrogen. The ethanol formed
is subsequently distilled off slowly through a column
until the temperature in the flask reaches 133°–135°C.
This temperature is attained after about 6 hours, 285 g
of distillate then being present. The working up is car-
ried out in an analogous manner to that described in
Example 1. There are obtained 105 g of 5-methyl-2-
[3'-methyl-2'buten]yl-4-hexenal (28 percent of the-
ory) of boiling point 102°–114°C/10 mmHg; $n_D^{20} = 1.4661$.

EXAMPLE 5

In an analogous manner to that described in Example 3, 400 g of 5-methyl-4-hexenal diethylacetal, 275 g of 2-methyl-3-buten-2-ol, 1000 g of toluene and 25 g of pyridine hydrochloride are reacted for 7 hours. A further 50 g of 2-methyl-3-buten-2-ol are added and the reaction is stopped after 20 hours (total duration). The working up is carried out in an analogous manner to that described in Example 3 after the addition of 20 g of sodium acetate to the crude product before the distillation in a vacuum. There are obtained 180 g (46 percent of theory) of 5-methyl-2-[3'-methyl-2'-buten]yl-4-hexenal.

EXAMPLE 6

In an analogous manner to that described in Example 3, 300 g of 2,5-dimethyl-4-hexenal diethylacetal are reacted with 225 g of 3-methyl-1-penten-3-ol in the presence of 17.4 g of pyridine hydrochloride and 1000 ml of toluene. After 12 hours, a further 75 g of 3-methyl-1-penten-3-ol are added. The reaction is complete after 30 hours (total duration). After the addition of 13 g of sodium acetate to the crude mixture, the reaction product is fractionally distilled in a vacuum. There are obtained 160 g of 2,5-dimethyl-2-[3'-methyl-2'-buten]yl-4-heptenal of boiling point 157°–158°C/60 mmHg; $n_D^{20} = 1.4690$.

EXAMPLE 7

In an analogous manner to that described in Example 3, 150 g of 5-methyl-4-hexenal diethylacetal are reacted with 130 g of 3-methyl-1-penten-3-ol in the presence of 10.5 g of pyridine hydrochloride and 450 ml of toluene over a period of 30 hours, a further 25 g of 3-methyl-1-penten-3-ol being added after the first 15 hours. After working up in accordance with Example 3, there are obtained 75.7 g of 5-methyl-2-[3'-methyl-2'-buten]yl-4-heptenal of boiling point 125°–126°C/15 mmHg; $n_D^{20} = 1.4675$.

The starting materials used in the various Examples may be prepared as follows:

| starting material | source | $n_D^{20}$ | b.p. |
|---|---|---|---|
| 2-methyl-3-buten-2-ol | + | | |
| 3-methyl-1-penten-3-ol | + | | |
| 1-ethoxy-2,5-dimethyl-1,4-hexadiene | + | | |
| 5-methyl-4-hexanal diethyl-acetal | 5-methyl-4-hexen-1-al + | | |

The following Examples illustrate a typical odorant composition containing the aldehydes provided by the invention:

EXAMPLE A

Composition of the "hyacinth" type.

| | parts by weight |
|---|---|
| 5-methyl-2-[3'-methyl-2'-buten]yl-4-hexenal | 20 |
| phenylacetaldehyde (50%) | 5 |
| indole (10%) | 5 |
| skatole (1%) | 5 |
| galbanum essence | 10 |
| hydratropaldehyde dimethylacetal | 10 |
| eugenol | 20 |
| phenyl ethyl cinnamate | 30 |
| phenyl ethyl formate | 30 |
| phenyl propyl alcohol | 30 |
| benzyl acetate | 30 |
| citronellol | 30 |
| phenyl ethyl salicylate | 50 |
| phenyl ethyl isobutyrate | 50 |
| cinnamic alcohol synth. | 50 |
| hydroxycitronellal | 70 |
| phenyl ethyl alcohol | 180 |
| | 625 |

The 5-methyl-2-[3'-methyl-2'-buten]yl-4-h imparts to the composition an exceptional finene natural freshness.

EXAMPLE B

Composition of the "chypre" type.

| | parts by w |
|---|---|
| 2,5-dimethyl-2-[3'-methyl-2'-buten]-yl-4-hexenal | 60 |
| olibanum resinoid | 10 |
| mace oil (10%)* | 10 |
| methylnonylacetaldehyde (1%)* | 20 |
| 2,6,10-trimethyl-9-undecen-1-al (10%) | 10 |
| undecylenaldehyde (10%)* | 10 |
| γ-undecalactone (1%)* | 10 |
| vetiver oil Bourbon | 20 |
| sandalwood oil East Indies | 40 |
| patchouli oil | 40 |
| 1,1,4,4-tetramethyl-6-ethyl-7-acetyl-1,2,3,4-tetrahydronaphthalene | 40 |
| abs. oak moss decolorised | 40 |
| linalool | 40 |
| bergamotte oil | 80 |
| hydroxycitronellal | 140 |
| α-ionone | 100 |
| citronellol laevo | 80 |
| phenyl ethyl alcohol | 100 |
| jasmine, abs. synth. | 150 |
| | 1000 |

* in phthalic acid diethyl ester

The 2,5-dimethyl-2-[3'-methyl-2'-buten]yl-nal imparts to the chypre composition freshnes fruity character and, at the same time, the diff increased.

What we claim is:

1. An odorant composition which contains essential odour-imparting ingredient an olfa effective amount of an aldehyde of the general f

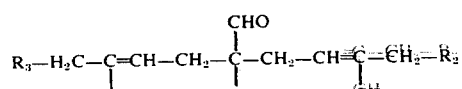

Wherein $R_1$, $R_2$ and $R_3$ each represent a hydrog or a methyl group.

n odorant composition according to claim 1 contains an aldehyde of the general formula:

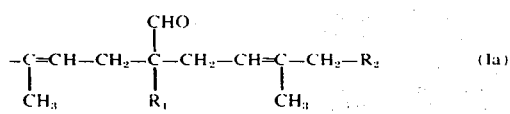

$R_1$ and $R_2$ each represent a hydrogen atom or yl group.

n odorant composition according to claim 2 contains 2,5-dimethyl-2-[3′-methyl-2′-buten]yl-1al.

4. An odorant composition according to claim 2 which contains 5-methyl-2-[3′-methyl-2′-buten]yl-4-hexenal.

5. A method of imparting an odour to materials which comprises applying thereto or incorporating therein an olfactorily effective amount of an aldehyde of claim 1.

6. A method according to claim 5, wherein an aldehyde of claim 2 is used.

7. A method according to claim 6, wherein 2,5-dimethyl-2-[3′-methyl-2′-buten]yl-4-hexenal is used.

8. A method according to claim 6, wherein 5-methyl-2-[3′-methyl-2′-buten]yl-4-hexenal is used.

* * * * *

UNITED STATES PATENT OFFICE
CERTIFICATE OF CORRECTION

Patent No. 3,926,859     Dated December 16, 1975

Inventor(s) Dieter Lamparsky et al.

It is certified that error appears in the above-identified patent and that said Letters Patent are hereby corrected as shown below:

On the Title page, under "Other Publications", "Steffen Arctauder" should read -- Steffen Arctander --.

Column 1, formula Ia should read as follows:

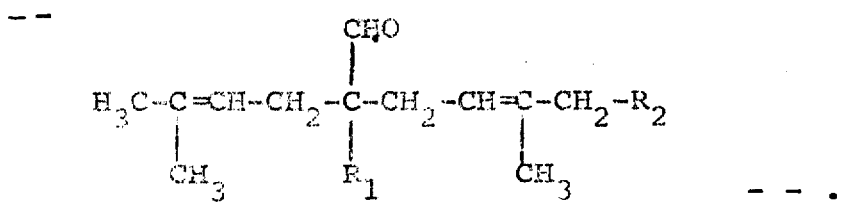

Column 4, line 41, "distils" should read -- distills --.
Column 4, line 46, "percent" should read symbol -- % --.
Column 4, line 66, "percent" should read symbol -- % --.
Column 5, line 13, "percent" should read symbol -- % --.

Signed and Sealed this

Twentieth Day of July 1976

[SEAL]

Attest:

RUTH C. MASON
Attesting Officer

C. MARSHALL DANN
Commissioner of Patents and Trademarks